Patented May 20, 1930

1,759,115

UNITED STATES PATENT OFFICE

WILLIAM C. HOOEY, OF PALMERTON, PENNSYLVANIA, ASSIGNOR TO THE NEW JERSEY ZINC COMPANY, OF NEW YORK, N. Y., A CORPORATION OF NEW JERSEY

MANUFACTURE OF LITHOPONE

No Drawing.     Application filed December 15, 1925. Serial No. 75,621.

This invention relates to the manufacture of lithopone and has for its object the provision of certain improvements in lithopone manufacture.

Lithopone is a white pigment composed of zinc sulfide and barium sulfate. In the manufacture of lithopone, aqueous solutions of zinc sulfate ($ZnSO_4$) and barium sulfide (BaS) are mixed in about molecular proportions. Upon the mixing of these solutions there results a heavy, flocculent, white precipitate consisting of an intimately associated admixture of zinc sulfide (ZnS) and barium sulfate ($BaSO_4$). The coprecipitate of zinc sulfide and barium sulfate is washed, filter-pressed and dried. The dried product is known in the industry as "crude lithopone". Crude lithopone is not suitable for paint purposes, but when it is heated, say to a temperature of 650—900° C., and suddenly cooled, by plunging (quenching) into cold water, its physical properties are so modified as to adapt it for paint purposes.

The solutions of zinc sulfate and barium sulfide are generally mixed in wooden tubs or tanks. Thus, it is the usual practice to introduce a predetermined quantity of the zinc sulfate solution or liquor into the precipitating tank and then to gradually add the barium sulfide solution or liquor with constant stirring until tests show the desired reaction to have been completed. It is the customary practice to continue the addition of the barium sulfide solution until appropriate tests indicate the presence of an "excess" of that solution over and above the amount required to satisfy the zinc sulfate in accordance with the following reaction:

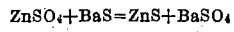

$$ZnSO_4 + BaS = ZnS + BaSO_4$$

Heretofore, the desired "excess of barium sulfide" in the precipitating liquors, and hence the end-point of the precipitating step or reaction, has been usually determined by testing a filtered sample of the mixture (crude pulp) in the precipitating tank for barium (as, by titration with sulfuric acid) or for sulfide sulfur (as by titration with iodine or with a solution of zinc chloride). I have discovered that crude lithopones of uniform properties cannot be produced where the "excess" of barium sulfide and the end-point of the precipitating reaction is determined by these heretofore customary methods of testing. Thus, I have found in actual plant practice (with all other conditions and manipulative steps the same) that crude lithopones of different physical properties may result when the precipitation is carried on under apparently identical conditions with identically the same "excess" of barium sulfide at the completion of the reaction as indicated by these heretofore customary tests.

It has heretofore been recognized as a scientific fact that an aqueous solution of barium sulfide does not contain barium sulfide (BaS) as such, but that upon solution the chemical compound "BaS" is hydrolized so that the barium is present in solution as barium hydrate ($Ba(OH)_2$) and barium sulfhydrate ($Ba(SH)_2$). This hydrolizing of barium sulfide when dissolved in water may be expressed by the following equation:

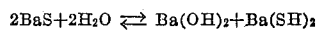

$$2BaS + 2H_2O \rightleftarrows Ba(OH)_2 + Ba(SH)_2$$

In the lithopone industry, this dissociation of barium sulfide when dissolved in water has not been recognized, or, if recognized, has been considered of no significance or importance. Thus, the heretofore customary methods of determining the so-called "barium sulfide excess" and hence the end-point of the precipitating reaction have been based on the supposition that the barium was present as the chemical compound "barium sulfide", or, in any event, that a determination of either barium or sulfide sulfur accurately indicated the desired "excess" of barium sulfide in the precipitating liquors.

I have found that these heretofore customary methods of expressing and determining the end-point of the precipitating reaction in terms of barium or sulfide sulfur are unreliable and under plant conditions of manufacture cannot be depended upon to produce uniform crude lithopones. I have, moreover, discovered that the significant factor in determining the so-called "barium sulfide excess" is not the amount of barium or sulfide sulfur in the filtered sample of the crude pulp as heretofore supposed, but the excess of and ratio between the amounts of barium present in solution as hydrate and sulfhydrate. The effective excess of barium liquor in the crude pulp (at the end-point of the precipitating step) is further dependent upon (usually proportional to) the amount of mother liquor left in the crude press cake.

My present invention contemplates determining the end-point of the reaction between the zinc sulfate solution and the barium sulfide solution in the precipitating step or stage by testing the filtrate of a sample of the mixture (crude pulp) in the precipating tank for hydrate and sulfhydrate radicals. More particularly, the invention contemplates determining or setting the end-point of the reaction by a predetermined excess of hydrate and/or sulfhydrate and a predetermined ratio of hydrate to sulfhydrate radicals in such filtrate. The invention further contemplates controlling the reaction between the zinc sulfate solution and the barium sulfide solution so as to establish at the end-point a predetermined excess of and ratio between the hydrate and sulfhydrate radicals present in the filtrate of a sample of the mixture in the precipitating tank.

In the precipitating step or stage of lithopone manufacture an appropriate amount of the zinc sulfate solution is run into the precipitating tank. Barium sulfide solution is then gradually added to the zinc sulfate solution in the tank, and the mixture in the tank is constantly stirred. As the end-point of the reaction is approached, the mixture in the tank is frequently tested with appropriate indicators. An excess of the barium sulfide solution over and above the amount necessary to react with the zinc sulfate solution is indicated when the crude pulp has an alkaline reaction, as, for example, when tested with phenolphtalein. In practice, the amount or degree of "barium sulfide excess" is usually gauged by the depth of the pink tint obtained in the phenolphtalein test.

In carrying out the present invention, the filtrate from a sample of the crude pulp, that is the mixture in the precipitating tank after the zinc sulfate has been satisfied, is tested or analyzed for hydrate and sulfhydrate radicals. To this end an appropriate sample of the crude pulp is taken and filtered. A known portion of the filtrate is then quantitatively tested for hydrate (OH) and a known portion of the filtrate is quantitatively tested for sulfhydrate (SH). Both the excess of and ratio between the hydrate and sulfhydrate radicals in the crude pulp are thus determined.

Any appropriate procedures for hydrate and sulfhydrate determinations may be employed. I have found it convenient to titrate 25 cc. of the filtrate with N/10 iodine solution (iodine dissolved in an aqueous solution of potassium iodide) for the sulfhydrate determination, and to titrate 250 cc. of the filtrate with .25 N hydrochloric acid (HCl) solution, using about 3 drops of ½% phenolphthalein solution as an indicator, for the hydrate determinations.

In order to promote uniformity of the finished lithopone, a predetermined excess of and ratio between the hydrate and sulfhydrate radicals in the crude pulp should be established at the end-point of the precipitating step. To this end, the hydrate-sulfhydrate ratio in the barium sulfide liquor may be appropriately adjusted and controlled, or the excess of and ratio between the hydrate and sulfhydrate radicals in the crude pulp may be adjusted and controlled, or both of these methods of adjustment and control may be employed. In any event, the aim of the invention in this respect is to establish a predetermined excess of and ratio between the hydrate and sulfhydrate radicals in the crude pulp at the end-point of the precipitating step.

I have found that different barium ores (barytes) treated identically produce barium sufide solutions which, when precipitated with uniform zinc sulfate solution, give different kinds of crude lithopone requiring different calcining manipulations and different general handling throughout the balance of the lithopone plant. An important difference in various lots of barium sulfide solutions is the ratio of sulfide sulfur to barium, which determines the ratio of barium hydrate to barium sulfhydrate. In what may be considered a typical barium sulfide solution, the ratio of barium present as hydrate to barium present as sulfhydrate is approximately 53 to 47. The barium present as sulfhydrate in such solutions may, however, vary in practice from 44 to 51%, while the barium present as hydrate may correspondingly vary from 56 to 49%. Other conditions remaining the same, I have found that substantially uniform crude lithopones will be produced when the crude pulps contain substantially the same excess of and ratio between barium hydrate and barium sulfhydrate.

The predetermined excess of and ratio between the hydrate and sulfhydrate radicals in the crude pulp at the end-point of the precipitating step may be arbitrarily chosen to suit the average or most usual barium sulfide solution used in the plant. Where the end-point of the precipitating step is determined by establishing this predetermined (arbitrarily chosen if desired) excess of and ratio between the hydrate and sulfhydrate radicals in the crude pulp, other conditions remaining constant, substantially uniform crude lithopones will be produced.

The predetermined excess and ratio of hydrate and sulfhydrate radicals at the end-point of the precipitating step may be chosen with the view of imparting certain desired physical properties to the finished lithopone, as more fully described and explained in my copending application, Serial No. 75,622 filed Dec. 15, 1925. Thus, for example, the oil-absorbing properties of the finished lithopone depend, to some extent at least, upon the excess of and ratio between the hydrate and sulfhydrate radicals in the crude pulp. In general, the greater the amount of hydrate radical in the crude pulp the lower will be the oil-absorption of the finished lithopone, other conditions being the same. Again, increasing amounts of hydrate radical in the crude pulp facilitate the production of a finished lithopone of alkaline characteristics, other conditions remaining the same.

The establishment of the desired predetermined excess and ratio of hydrate and sulfhydrate radicals at the end-point of the precipitating step can be effected in various ways. I prefer to first regulate and control the barium sulfide liquor itself. Any necessary final adjustment can then be made in the precipitating tanks. Thus, the barium sulfide solution is prepared so as to maintain an established ratio of barium hydrate to barium sulfhydrate. These solutions are analyzed or tested and their preparation is so controlled as to maintain this desired ratio substantially constant. The usual corrective for the barium sulfide solution is the addition thereto of barium hydrate ($Ba(OH)_2$).

In addition to controlling the ratio of barium hydrate to barium sulfhydrate in the barium sulfide solution, analyses or tests of the filtrate from a sample of the crude pulp should preferably be made, as hereinbefore described. At this stage, the ratio of the hydrate radical to the sulfhydrate radical can be increased by adding barium hydrate to the crude pulp, and the ratio of the hydrate radical to the sulfhydrate radical can be decreased by adding sulfuric acid to the crude pulp. In ordinary plant practice, the crude pulp will be stored for a period of from one to eight hours, and where great refinement of control is desired, analyses or tests of the crude pulp may be made during this period of storage, and any necessary corrective measures taken to establish the desired predetermined excess and ratio of hydrate and sulfhydrate radicals. If desired, a final check on the excess and ratio of hydrate and sulfhydrate radicals in the crude pulp can be made by analyzing or testing the filtrate from the crude lithopone filters.

The regulation and control of the barium present as hydrate and as sulfhydrate in the barium sulfide solution can be promoted in various ways. In general, barytes of high iron or manganese content produce solutions or liquors relatively high in barium hydrate, and by stocking the baryte ores of different iron and/or manganese content, one is able to select ores that will produce solutions either relatively high or low in hydrates. The hydrate content of the barium sulfide solution can also be regulated by appropriately mixing ores of different iron and/or manganese content.

The barium hydrate content of the barium sulfide solution can also be increased by the use of a moist charge in the baryte furnaces. Decreasing the proportion of coal in the charge of the baryte furnaces also tends to increase the barium hydrate content of the resulting barium sulfide solution. These expedients, however, may lower the recovery of barium from the ore.

In leaching the black ash (product of the baryte furnaces), the first wash will contain a relatively large proportion of barium sulfhydrate; the second wash will contain less barium sulfhydrate and more barium hydrate, and subsequent washes will be high in barium hydrate particularly with the use of hot water. The solid phase or residue will be high in barium hydrate. Accordingly, as leaching efficiency improves, slightly higher hydrate contents are obtained because the last extractions run higher in barium hydrate.

In analyzing or testing the barium sulfide solution or liquor, the following procedure has been found convenient in actual practice:

A ten cubic centimeter (cc.) sample of barium sulfide liquor (at about 60° C.) is put into a beaker containing 250 cc. of water. Three drops of ½% phenolphthalein solution as indicator are added and the solution titrated to a colorless endpoint with .35 N hydrochloric acid (HCl). To this same sample three drops of 0.1% methyl orange solution as indicator are then added and titrated with .35 N hydrochloric acid to a slight pink endpoint. The first part of the analysis with the phenolphthalein indicator determines the basic radical (OH), while the second part of the analysis with the methyl orange indicator determines the basic radical (SH). If $a$ and $b$ represent the number of cubic centimeters of hydrochloric acid used in the first and second parts, respectively, of the analysis, then the percentage of hydrate and sulfhydrate radicals in the barium solution are calculated as follows:

Percent hydrate (OH) $=\frac{a}{a+b}\times 100$

Percent sulfhydrate (SH) $=\frac{b}{a+b}\times 100$

It is possible in some instances to obtain the predetermined excess and ratio of hydrate and sulfhydrate radicals, contemplated by the invention, by hydrates other than barium hydrate. In other words, while the full advantages of the invention are normally secured when the hydrate-sulfhydrate ratio represents the ratio of barium present as hydrate to the barium present as sulfhydrate, it may be possible, in some cases, to substitute other hydrates (such as calcium, magnesium or sodium) for part of the barium hydrate.

Where the hydrate is present in the crude pulp solely as barium hydrate and/or where it is not essential to accurately determine the so-called "barium sulfide excess", analyses or tests for hydrate alone may be employed instead of analyses or tests for both hydrate and sulfhydrate, as hereinbefore described. In such cases, the sulfhydrate content of the filtrate from a sample of the crude pulp may, if desired, be calculated by difference, the accuracy of this calculation depending largely upon the proportion of barium hydrate to other hydrates present in the crude pulp. Accordingly, in certain cases, as, for example, where refinement of control or uniformity is not essential, the establishment in the crude pulp of a predetermined excess of and ratio between the hydrate and sulfhydrate radicals at the endpoint of the precipitating step may be abbreviated or shortened in practice to the establishment in the crude pulp of a predetermined amount of hydrate.

I claim:

1. The improvement in the manufacture of lithopone which comprises determining the endpoint of the reaction between the zinc sulfate solution and the barium sulfide solution in the precipitating step by testing the filtrate of a sample of the crude pulp for hydrate and sulfhydrate radicals.

2. The improvement in the manufacture of lithopone which comprises testing the filtrate of a sample of the crude pulp for hydrate and sulfhydrate radicals, and determining the endpoint of the reaction between the zinc sulfate solution and the barium sulfide solution by the excess of and ratio between the hydrate and sulfhydrate radicals.

3. The improvement in the manufacture of lithopone which comprises controlling the reaction between the zinc sulfate solution and the barium sulfide solution in the precipitating step so as to establish at the endpoint of the reaction a predetermined ratio between the hydrate and sulfhydrate radicals present in the filtrate of a sample of the crude pulp.

4. The improvement in the manufacture of lithopone which comprises determining the endpoint of the precipitating step by the excess of and ratio between the hydrate and sulfhydrate radicals in the crude pulp.

5. The improvement in the manufacture of lithopone which comprises controlling the reaction between the zinc sulfate solution and the barium sulfide solution in the precipitating step so as to establish a predetermined excess of and ratio between the hydrate and sulfhydrate radicals in the crude pulp at the endpoint of the reaction.

6. The improvement in the manufacture of lithopone which comprises promoting uniformity in the finished product by establishing a predetermined excess of and ratio between the hydrate and sulfhydrate radicals in the crude pulp at the endpoint of the precipitating step.

7. The improvement in the manufacture of lithopone which comprises establishing a predetermined ratio of hydrate and sulfhydrate radicals in the crude pulp at the endpoint of the precipitating step.

8. The improvement in the manufacture of lithopone which comprises determining the endpoint of the precipitating step by the excess of and ratio between the barium hydrate and barium sulfhydrate in the crude pulp.

9. The improvement in the manufacture of lithopone which comprises establishing a predetermined excess of and ratio between the barium hydrate and barium sulfhydrate in the crude pulp at the endpoint of the precipitating step.

In testimony whereof I affix my signature.

WILLIAM C. HOOEY.